INVENTORS
THOMAS L. TAYLOR &
ELWIN C. WIGTON
BY
Cyril A. Krenzer
ATTORNEY

INVENTORS
THOMAS L. TAYLOR &
ELWIN C. WIGTON

BY

ATTORNEY

United States Patent Office 3,450,937
Patented June 17, 1969

3,450,937

OSCILLATOR DRIVE CIRCUITRY

Thomas Lester Taylor and Elwin Cleland Wigton, Batavia, N.Y., assignors to Sylvania Electric Products Inc., a corporation of Delaware Filed Apr. 18, 1968, Ser. No. 722,368
Int. Cl. H01j 29/70
U.S. Cl. 315—27 10 Claims

ABSTRACT OF THE DISCLOSURE

A fast switching signal drive circuit includes an oscillator means for developing a potential having a relatively slow switching period which is coupled by a switching means to a charging circuit connected intermediate a voltage source and a voltage reference level. The switching means isolates the oscillator means and charging circuit until such time as the potentials applied thereto render the switching means conductive. Upon conduction of the switching means, a drive signal having a relatively fast switching period is provided.

*Background of the invention*

In cathode ray tube apparatus and particularly television receivers, it is well known that synchronization of the electron beam of the cathode ray tube viewing the scene is essential. Thus, it is a common practice to provide a cathode ray tube sweep system in the receiver which can be synchronized with a transmitted control signal.

As is also well known, the sweep system in the usual television receiver and more particularly the horizontal sweep system, normally includes an output system in the form of a power-type discharge device, an output or flyback transformer, a cathode ray tube, damper circuitry, and a high voltage power supply. Coupled to the power-type discharge device or horizontal output stage is a horizontal drive system which is commonly in the form of an oscillator stage wherein is developed a potential having a waveform needed to cause a substantially sawtooth-shaped current to flow through the deflection coils of the sweep system. Moreover, a control signal derived from the transmitted signals is applied to the drive system to provide the desired synchronization between the transmitted signal and the generated signals of a receiver.

Referring more specifically to drive systems, the prior art suggests numerous oscillator-type drive systems for developing a substantially sawtooth-shaped waveform of potential suitable for application to an output stage. Perhaps one of the better known of such systems is the so-called sine wave-type oscillator system wherein relatively stable sine wave voltages are developed and modified to provide a substantially saw-tooth shaped signal which is applied to the output stage for controlling the electron beam of a cathode ray tube coupled thereto.

Usually, the ordinary sine wave type oscillator circuitry is in the form of a pentode-type electron discharge device operated as an electron-coupled oscillator-amplifier essentially as shown in the prior art illustration of FIG. 1. The cathode, first, and second grid electrodes serve to provide the oscillator stage while the output circuitry includes the third grid electrode and plate circuit having a charging circuit in the form of a resistor and capacitor series connected intermediate a voltage source and a voltage reference level.

In operation of the oscillator stage, the capacitor of the charging circuit is charged through a resistor from a voltage source during that portion of the oscillator cycle when plate current flow therein is interrupted by the potential applied to the first grid electrode. When plate current flow through the oscillator discharge device resumes, the capacitor discharges therethrough and a substantially modified sawtooth-shaped waveform of output potential or drive signal is provided.

Although the above-described circuitry has received wide acceptance and use, because of the relatively inexpensive componentry and inherent stability, it has been found it does leave something to be desired insofar as speed with which potentials may be switched. For example, it has been found that the switching period, which may be defined as the time or speed with which the initial rate of plate current flow through the oscillator shifts from a non-conductive to a highly conductive state illustrated as A in the prior art drawing of FIG. 2, is relatively slow due to the magnitude and waveform of the potentials applied to the first grid electrode of the oscillator. Thus, the output signals from the oscillator stage which are normally the drive signals applied to the output stage of the sweep system, also have a relatively slow switching period.

Since the output stage of the sweep system is subjected to the application of a rapidly increasing plate voltage, during the retrace cycle of a flyback pulse system for instance, it is obvious that a fast switching drive potential is required to prevent plate current flow in the output stages of the sweep system. Moreover, any plate current flow in the discharge device of the output stage during this retrace cycle causes extra loading of the flyback system whereupon the efficiency of the system is undesirably lowered and the power dissipated in the discharge device of the output stage is undesirably increased.

In one known attempt to increase the switching speed of the drive circuitry, the magnitude of a modified sinusoidal voltage appearing at the first grid electrode of the oscillator is greatly increased. Thus, the first grid electrode operates on a steeper slope of the modified sinusoidal potential whereupon switching speed of the resultant drive signal is increased. Unfortunately, this increase in magnitude of the modified sinusoidal voltage and desired increased switching speed of the drive signal is accompanied by a most undesirable decrease in sensitivity of the drive system to any control signal applied thereto. Moreover, compensating for this undesired decrease in sensitivity when the magnitude of the sinusoidal voltage is increased normally, necessitates the undesirable addition of a reactance control in the form of a separate electron discharge device which, in turn, undesirably increases the circuitry cost.

*Objects and summary of the invention*

Therefore, it is an object of the present invention to provide an enhanced oscillator drive circuit. Another object of the invention is to improve the switching speed of an oscillator drive circuit in a television receiver. Still another object of the invention is to provide improved sweep circuitry for a television receiver. A further object of the invention is to enhance the efficiency of the sweep circuitry of a television receiver.

These and other objects are achieved in one aspect of the invention by a relatively fast switching oscillator-type drive circuit wherein a switching means is utilized to non-conductively isolate a charging circuit from the oscillator stage during the relatively slow charging of the capacitor and what would normally be the relatively slow initial period of conduction through the oscillator stage. When the switching means shifts to a conductive state, the oscillator stage is conductively coupled to the charging circuit to provide a drive signal having a relatively fast switching period which is applied to the electron device of the output stage of the sweep system.

*Description of the preferred embodiment*

For convenience and understanding, the present invention will be discussed in the atmosphere of a television receiver and more specifically in the atmosphere of the horizontal sweep circuitry of the television receiver. However, it is to be understood that the invention is not to be construed as limited thereto, but rather is applicable and appropriate to other apparatus. Also, reference is made to the accompanying drawings and appended claims in conjunction with the following disclosure for a better understanding of the present invention, together with other and further objects, advantages and capabilities thereof.

Figure 1:
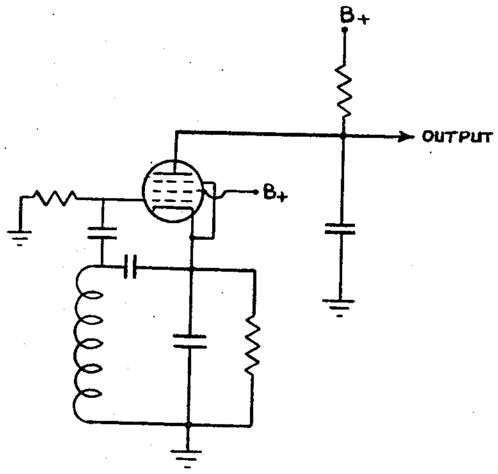
FIG. 1 PRIOR ART
FIG. 1 illustrates a prior art sine wave type oscillator rive circuit.
Figure 2:
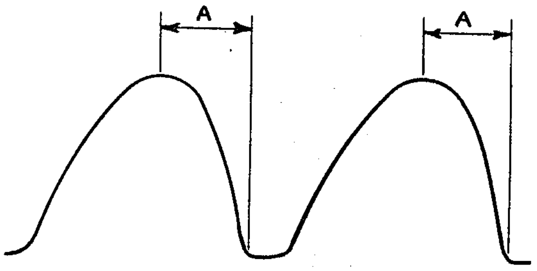
FIG. 2 PRIOR ART
FIG. 2 illustrates a portion of the drive signal, in exaggerated form, provided by the prior art circuitry of 'IG. 1.
Figure 3:
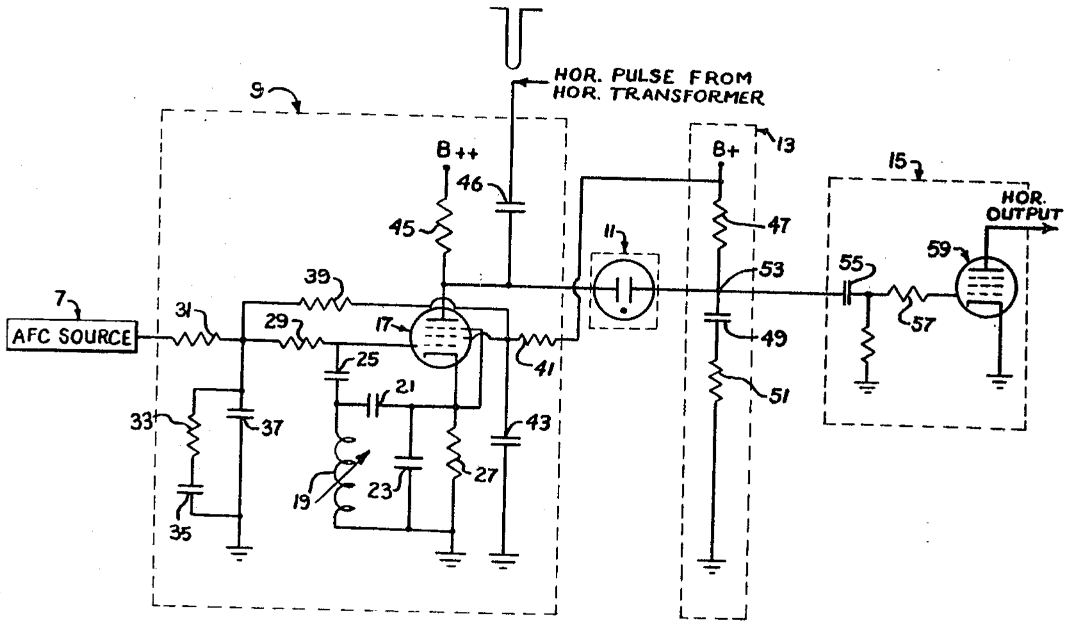
FIG. 3 illustrates a portion of the horizontal sweep ircuitry of a television receiver employing one embodiment of the fast switching oscillator-type drive circuitry of the invention.

Referring to the drawings, FIG. 3 illustrates a portion of the horizontal sweep circuitry of a television receiver. The sweep circuitry includes a source 7 of automatic frequency control (AFC) potentials, an oscillator stage 9, a switching means 11, a charging circuit 13, and a horizontal output stage 15. Also, the sweep circuitry includes the usual high voltage supply (not shown) and a cathode ray tube (not shown) commonly employed in television receivers.

The AFC source 7 may be in any one of a number of forms and a preferred type of circuitry includes a pair of rectifiers whereto is applied synchronizing pulse signals separated from the transmitted television signal and pulse signals derived from the output of the horizontal sweep circuitry. These applied signals are compared and provide a DC control potential representative of the frequency difference between the transmitted synchronizing pulse signals and the pulse signals derived from the sweep circuitry. This DC control potential becomes available from the AFC source 7 and is applied to the oscillator stage 9 to cause variations in the frequency of the output signals therefrom such that synchronization between the output signals and the synchronizing pulse signals is maintained. Thus, the DC potential available from the AFC source 7 serves to vary the operation of the oscillator stage 9 in a manner such that the frequency of the output signals therefrom remains substantially constant.

The oscillator stage 9, in this example, is in the form of an electron-coupled oscillator and includes a pentode-type electron discharge device 17 having the usual cathode, first, second, and third grid electrodes, and an anode or plate electrode. The oscillator portion of the stage 9 includes the cathode, first and second grid electrodes of the discharge device 17 and is in the well-known form of a Colpitts sine wave oscillator. Thus, the oscillatory portion of the circuitry includes an alterable inductor 19 or "hold" control shunted by a pair of series connected capacitors 21 and 23 respectively. The junction of the inductor 19 and capacitor 21 is coupled via a capacitor 25 to the first grid electrode of the discharge device 17 while the junction of the series connected capacitors 21 and 23 is coupled to the cathode electrode of the discharge device

17. Also, the junction of the inductor 19 and capacitor 23 is connected to a voltage reference level such as circuit ground while the bias resistor 27 couples the cathode electrode of the discharge device 17 to circuit ground.

The first grid electrode of the discharge device 17 is coupled via a pair of series connected resistors 29 and 31 to the AFC source 7 and via a filter network including series connected resistor 33 and capacitor 35 shunted by a capacitor 37 to circuit ground. The second grid electrode of the discharge device 17 is coupled to the first grid electrode via resistors 39 and 29 respectively and to a voltage source B+ via a resistor 41. Also, a by-pass capacitor 43 couples the second grid electrode of the discharge device 17 to the voltage reference level or circuit ground. Further, the third grid electrode of the discharge device is connected directly to the cathode electrode while the plate or anode electrode is coupled via a load resistor 45 to a boost voltage source B++ and via a capacitor 46 to a source of horizontal pulse signals normally available from a winding on a horizontal flyback transformer in the sweep circuitry.

A switching means 11, which will be explained more fully hereinafter, couples the anode electrode of the discharge device 17 to a charging circuit 13. The charging circuit 13 includes series connected resistor 47, capacitor 49, and resistor 51 coupled intermediate a voltage source B+ and the voltage reference level or circuit ground. The junction 53 of the charging circuit 13 is directly connected to the switching means 11 and via a series connected capacitor 55 and resistor 57 to the control grid electrode of the electron discharge device 59 of the horizontal output stage 15.

Figure 4:
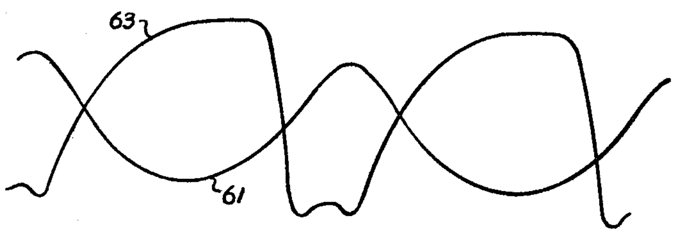
FIG. 4 illustrates a portion of the input and output potential waveform of the oscillator stage included in the liagram of FIG. 3.

As to the operation of the circuitry of FIG. 3, the oscillator stage 9 develops a substantially sinusoidal voltage at the horizontal frequency of about 15,750 kc. This sinusoidal voltage causes conduction of the discharge device 17 during the positive portion of the cycle which, in turn, causes current flow in the first grid electrode and charging of the capacitor 25. This capacitor 25 has a discharge path through the resistors 29 and 31 and the AFC source 7 to provide a substantially sawtooth-shaped waveform of potential. As a result, there is applied to the first grid electrode of the discharge device 17 a modified sinusoidal-shaped potential 61 illustrated in FIG. 4. Also, a DC potential from the AFC source 7 varies the bias of the discharge device 17 in a manner well known in the art such that the frequency of the signals developed therein remains substantially constant.

As mentioned above, the modified sinusoidal voltage 61 of FIG. 4 applied to the first grid electrode of the discharge device 17 causes conduction thereof during the positive portion of the cycle. Thus, the discharge device 17 in conjunction with wave-shaping circuitry, which includes the resistor 45 and capacitor 46, has appearing at the anode electrode thereof, a modified sawtooth-shaped waveform 63 illustrated in FIG. 4.

Figure 5:
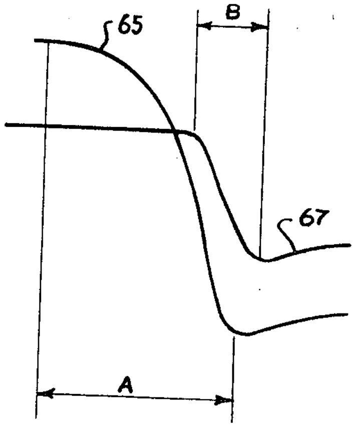
FIG. 5 is a comparison of waveform curves of the output signals from the oscillator stage and the drive signals applied to the sweep system output stage of the circuitry of FIG. 3.

Unfortunately, the modified sawtooth-shaped waveform 63 appearing at the anode electrode of the discharge device 17 and normally utilized as a drive signal, has a relatively slow switching period as illustrated at A of the exaggerated waveform 65 of FIG. 5. For example, the switching period A of the waveform 65 may be in the range of about 5 to 7 microseconds. This relatively slow initial switching period A of waveform 65, occurs because of the slope of the modified sinusoidal voltage, curve 61 of FIG. 4, applied to the first grid electrode of the discharge device 17. As previously explained, this modified sinusoidal waveform of potential serves to switch the discharge device 17 from a nonconductive to a conductive state. Moreover, enhancement of the speed of this switching feature by increasing the magnitude, and in turn the slope of the modified sisusoidal waveform 61, as accompanied by an undesired and deleterious reduction in sensitivity of the first grid electrode of the discharge device 17 to the control signals provides by the AFC source 7. Thus, the usual technique for overcoming this reduction in sensitivity is the addition of a reactance stage to control the frequency shift which is an undesired and expensive solution to the problem.

However, it has been found that a switching means 11, which may be in the form of an electron device or diode but preferably is in the form of a neon lamp, coupled intermediate the oscillator stage 9 and the charging circuit 13 greatly enhances the drive signal applied to the horizontal output stage 15. More specifically, the switching means 11 remain in a non-conductive state and serves to isolate the oscillator stage 9 from the charging circuit 13 during the period of charging of the capacitor 49 and during the relatively slow switching period, A of curve 65, when the oscillator stage 9 shifts from a non-conductive to a conductive state. As the potential on the plate electrode of the discharge device 17 goes less positive and the potential built up on the capacitor 49 of the charging circuit 13 becomes more positive, the potential applied to the switching means 11 reaches an ignition potential which shifts the switching means 11 from a non-conductive to a conductive state. This conductive state is maintained as the capacitor 49 discharges through the discharge device 17. As a result, a drive signal, curve 67 of FIG. 5, having a relatively fast switching period B is provided. In practice, it has been found that a relatively fast switching period in the range of about two (2) to three (3) microseconds is attainable when the above-mentioned switching means 11 is employed.

Additionally, the switching period B or the slope of the drive signal, curve 67 of FIG. 5, may be further enhanced by applying a negative-going pulse signal available from a winding on the flyback transformer via the capacitor 46 to the junction of the oscillator stage 9 and the switching means 11. In this manner, the applied pulse signal remains isolated from the horizontal output stage 15 because of the switching means 11 except during the conductive period of the switching means 11. Thus, the trace period of the sawtooth-shaped waveform available from the horizontal output stage 15 and applied to a cathode ray tube (not shown) is substantially unaffected by the added negative-going pulse signal. This condition contrasts greatly with prior known techniques wherein a negative-going pulse signal was applied directly to the horizontal output stage 15. In such instances, the added negative-going pulse signal was necessarily limited in magnitude because of the deleterious effect thereof upon the trace or sawtooth-shaped portion of output signals available from the horizontal output stage 15.

As a result of the above-described relatively fast switching period of the drive signal, it has been found that the efficiency of the horizontal output system and particularly of the horizontal output stage 15 is greatly increased. Since it is well known that a relatively high pulse potential is applied to the output electrode of the horizontal output stage 15 during the period of scan retrace, it is obvious that a drive signal having a relatively fast switching speed is of paramount importance.

In other words, the switching period of an applied drive signal determines the plate current flow in the horizontal output stage 15 during the retrace portion of the cycle. Thus, a drive signal having an undesired relatively slow switching period causes undesired extra loading of the horizontal output system necessitating a horizontal output discharge deivce of increased dissipation capabilities.

Figure 6:
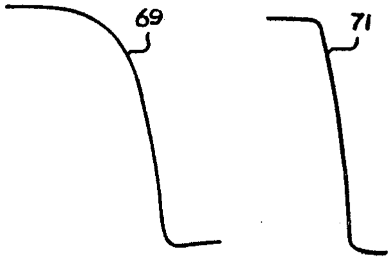
FIG. 6 is comparative illustration of current flow curves in the output stages of sweep circuitry wherein the switching means is omitted and included.

As an illustrative example of the enhanced capabilities of the above-described circuitry, reference is made to the comparative horizontal output discharge device cathode current curves of FIG. 6. In FIG. 6, curve 69 illustrates the cathode current of the output discharge device of a well-known prior art sweep circuit employing a sine-wave type oscillator stage wherein the output signals appearing at the oscillator stage are employed as the drive signals for the horizontal output stage. In contrast, curve 71 illustrates the cathode current of a horizontal output stage in a somewhat similar sweep circuit except that this sweep circuit includes the above-described switching means 11 coupled intermediate the oscillator stage 9 and the charging circuit 13. As the comparison clearly illustrates, current flow of the output discharge device is reduced and efficiency of the system enhanced when the switching means 11 is employed in the sweep circuitry.

For purposes of illustration and not to be construed in any manner as limiting, the following values and components are applicable to the embodiment illustrated in FIG. 3:

| | |
|---|---|
| B+ voltage | 270 v. D.C. |
| B++ boost voltage | 650 v. D.C. |
| Switching means **11** | 5AH (General Electric Co.). |
| Neon lamp | NE83 (Signalite Co.). |
| Capacitors: | |
| **46** | 47 $\mu\mu$f. |
| **49** | 560 $\mu\mu$f. |
| Resistors: | |
| **45** | 820K ohms. |
| **47** | 47K ohms. |
| **51** | 12K ohms. |

While there has been shown and described what is at present considered the preferred embodiments of the invention, it will be obvious to those skilled in the art that various changes and modifications may be made therein without departing from the invention as defined by the appended claims.

What is claimed is:

1. In a television receiver sweep system, fast switching drive circuitry comprising in combination:
- a control signal source;
- oscillator means coupled to said source for developing a potential having a waveform with a relatively slow switching period;
- charging circuit means coupled intermediate a potential source and a potential reference level, and
- switching means coupling said charging circuit means and said oscillator means to provide a drive signal potential having a waveform with a relatively fast switching period.

2. The combination of claim 1 including output circuit means coupled to said charging circuit means and responsive to said drive signal potential having a relatively fast switching period to provide a substantially sawtooth-shaped current flow through the deflection coils associated with a cathode ray tube.

3. The combination of claim 1 including means for applying a negative-going pulse signal to the junction of said oscillator means and switching means.

4. The combination of claim 1 wherein said switching means is in the form of a diode.

5. The combination of claim 1 wherein said switching means is in the form of a neon lamp.

6. The combination of claim 1 wherein said switching means is in the form of an electron device.

7. In a cathode ray tube display system, a fast switching signal drive circuit comprising in combination:
- oscillator means for developing a potential having a modified sine wave-shaped potential with a relatively slow switching period;
- charging circuit means coupled intermediate a potential source and a potential reference level; and
- switching means coupling said charging circuit means to said oscillator means to provide a drive signal potential having a relatively fast switching period.

8. The combination of claim 7 wherein said oscillator ıeans is in the form of an electron coupled sine wave scillator.

9. The combination of claim 7 wherein said switching ıeans is in the form of a diode.

10. The combination of claim 7 wherein said switching ıeans is in the form of a neon lamp.

No references cited.

RODNEY D. BENNETT, Jr., *Primary Examiner.*

J. G. BAXTER, *Assistant Examiner.*

U.S. Cl. X.R.

331—75